Figure 1:
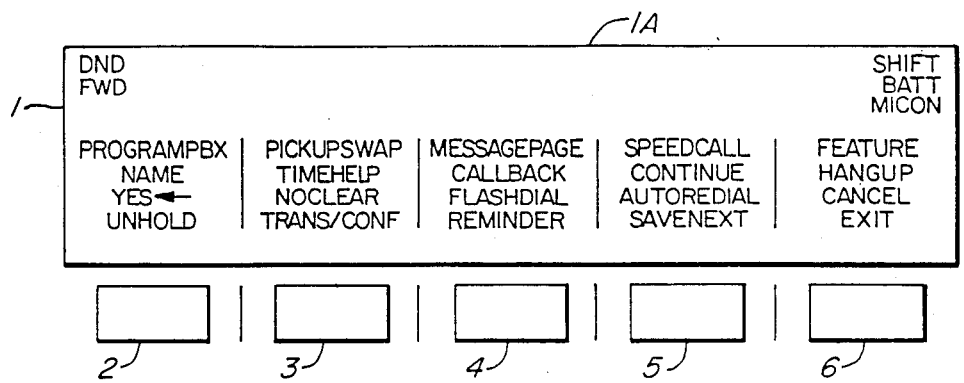

United States Patent [19]
Brennan et al.

[11] Patent Number: 4,788,720
[45] Date of Patent: Nov. 29, 1988

[54] PROGRAMMABLE SUBSCRIBER SET

[75] Inventors: Robert P. Brennan, Pakenham; Joseph Camelon, Richmond; J. Bernard Trudel, Ottawa; Albert L. M. Hum, Nepean; Donald G. McLeod, Kanata, all of Canada

[73] Assignee: Trillium Telephone Systems Inc., Ontario, Canada

[21] Appl. No.: 903,143

[22] Filed: Sep. 3, 1986

[30] Foreign Application Priority Data

May 12, 1986 [CA] Canada ................................. 508859

[51] Int. Cl.$^4$ ............................................. H04M 3/42
[52] U.S. Cl. .................................... 379/201; 379/354; 379/355
[58] Field of Search ............... 379/201, 156, 157, 162, 379/163, 164, 165, 201, 202, 203, 204, 205, 206, 210, 211, 212, 213, 214, 215, 216, 217, 350, 352, 353, 354, 355, 387, 393, 396, 375

[56] References Cited

U.S. PATENT DOCUMENTS

| | | | |
|---|---|---|---|
| 4,291,198 | 9/1981 | Anderson et al. | 379/354 X |
| 4,409,439 | 10/1983 | Gamble | 379/375 X |
| 4,453,040 | 6/1984 | Wolf et al. | 379/200 X |
| 4,481,382 | 11/1984 | Villa-Real | 379/88 X |
| 4,613,730 | 9/1986 | Fechalos et al. | 379/355 |
| 4,665,545 | 5/1987 | Galensky et al. | 379/157 X |

OTHER PUBLICATIONS

Krepick, William, "Smart Phones Aren't Coming--They're Here", Telephony, Feb. 26, 1979 pp. 45-52.

Primary Examiner—James L. Dwyer
Attorney, Agent, or Firm—Antonelli, Terry & Wands

[57] ABSTRACT

A subscriber set for connection via tip and ring leads to a remote communication system such as a PABX or centrex. The remote communication system is capable of implementing a plurality of special features such as hold, call transfer, call forward, etc. The set is comprised of a microprocessor and electronic telephone circuit connected to a plurality of programmable function keys, for generating one or more centrex or PBX special feature access code signals in response to depression of predetermined ones of the keys. An LCD display is connected to the microprocessor for generating prompt signals for indicating implementation of predetermined ones of the special features associated with depression of corresponding ones of the keys. The special feature access code signals are programmed into the set such that the set may be used with a variety of PABX and centrex facilities in lieu of expensive proprietary subscriber sets or awkward and difficult to use standard type 2500 sets.

16 Claims, 3 Drawing Sheets

PROGRAMMABLE SUBSCRIBER SET

This invention relates in general to telephone systems and more particularly to a programmable subscriber set for initiating implementation of a plurality of PABX (Private Automatic Branch Exchange) or centrex special features.

Modern day communication systems such as PABX and centrex facilities, offer various special features such as call transfer, hold, conference, call back, etc. Expensive proprietary subscriber sets are typically provided for use with such systems. The proprietary sets generally include dedicated keys for implementing respective ones of the special features.

In operation, the proprietary sets function as translators for automatically generating predetermined key identification data signals along the tip and ring leads of a quad telephone line connecting the set and communication system in response to depression of predetermined special feature access keys. The system recognizes the key identification signals as being a request to implement a predetermined special feature and consequently implements the feature.

Certain sophisticated proprietary sets, such as the SUPERSET 4 TM subscriber set manufactured by Mitel Corporation, include displays for generating prompt signals to guide the user in implementing the special features, in response to receiving further data signals from the remote PABX. Various ones of the SUPERSET 4 TM subscriber set keys are "soft" or exhibit multiple functions dependent upon the state of a telephone call in progress, such that any one of a plurality of functions (eg., hold, transfer, etc.,) may be associated with a particular one of the keys in response to the received PABX data signals and in accordance with the displayed message signal.

Prior art proprietary sets suffer from the disadvantage that the data signals transmitted between the set and PABX (for designating key identification, prompt message display, ringing, etc.,) typically vary from one manufacturer to another such that a particular proprietary set may only be used with the PABX for which it was designed.

Special feature access code signals may also be manually generated by a local subscriber using a standard type 2500 telephone set. The subscriber performs a hookswitch flash, waits for dial tone, and then dials one or more predetermined digits designative of a predetermined special feature. The access code signals are then transmitted along tip and ring leads for reception by the remote communication system.

In order to perform a hookswitch flash, the local subscriber must depress the hookswitch of the set for a predetermined length of time and then release it. Alternately, an automatic hookswitch flash function may be incorporated into the set for implementation in response to a predetermined flash button being depressed. Next, he or she must dial the predetermined access code corresponding to the special feature to be implemented. Accordingly, the local subscriber must either memorize the different codes corresponding to various special features or else must refer to a chart or table designating the correlation between the special features and dialled access codes.

It has been found that subscribers are frequently reluctant to perform manual hookswitch flashing for fear of disconnecting a call in progress. Also, the necessity of either memorizing feature access codes or constantly referring to a chart or table of codes has been found to be inconvenient and cumbersome.

Additional sets have been developed which utilize speedial circuitry for automatically generating and applying DTMF signals to the tip and ring leads corresponding to a predetermined telephone number, in response to depression of an associated speedial key. Also, certain sophisticated speedial sets have incorporated circuitry for effecting a hookswitch flash, pause and programmable DTMF signal generation in response to depression of the associated speedial keys.

The prior art speedial sets suffer from the disadvantage of utilizing "hard" keys whereby each speedial key has a single function (e.g., speedial, hold, transfer, etc.,) associated with it. Consequently, only a limited number of the typically available PABX or centrex special features can be implemented automatically. In addition, the user is required to initiate special feature or speedial implementation without the benefit of prompt message displays, such as the displays found in certain prior art proprietary sets.

According to the present invention, a programmable set is provided wherein a multiplicity of special feature functions may be programmed into the set for generation upon depression of predetermined soft keys, whereby the set generates a corresponding special feature access code tailored to the requirements of the particular PABX or centrex to which it is connected. An LCD display is provided for prompting the subscriber 10 depress predetermined ones of the keys for implementing the various special features available at different times during the course of a telephone call. The display is oriented relative to the soft keys for designating which of the plurality of special features is associated with depression of corresponding ones of the keys. Thus, at predetermined times during the course of the telephone call, depression of a particular one of the soft keys results in different special features being implemented.

The programmable subscriber set of the present invention operates equally well with PABX or centrex systems of various manufacturers, contrary to prior art proprietary sets, yet overcomes the prior art disadvantage of standard type 2500 sets wherein the subscriber is required to manually flash the hookswitch and recall from memory a multiplicity of feature access codes, or constantly refer to a table or chart for determining the proper codes to be manually dialled subsequent to flashing the hookswitch. Also, contrary to prior art speedial sets, soft keys are utilized wherein a multiplicity of functions are accommodated and prompt messages are displayed for guiding the user.

Figure 2:
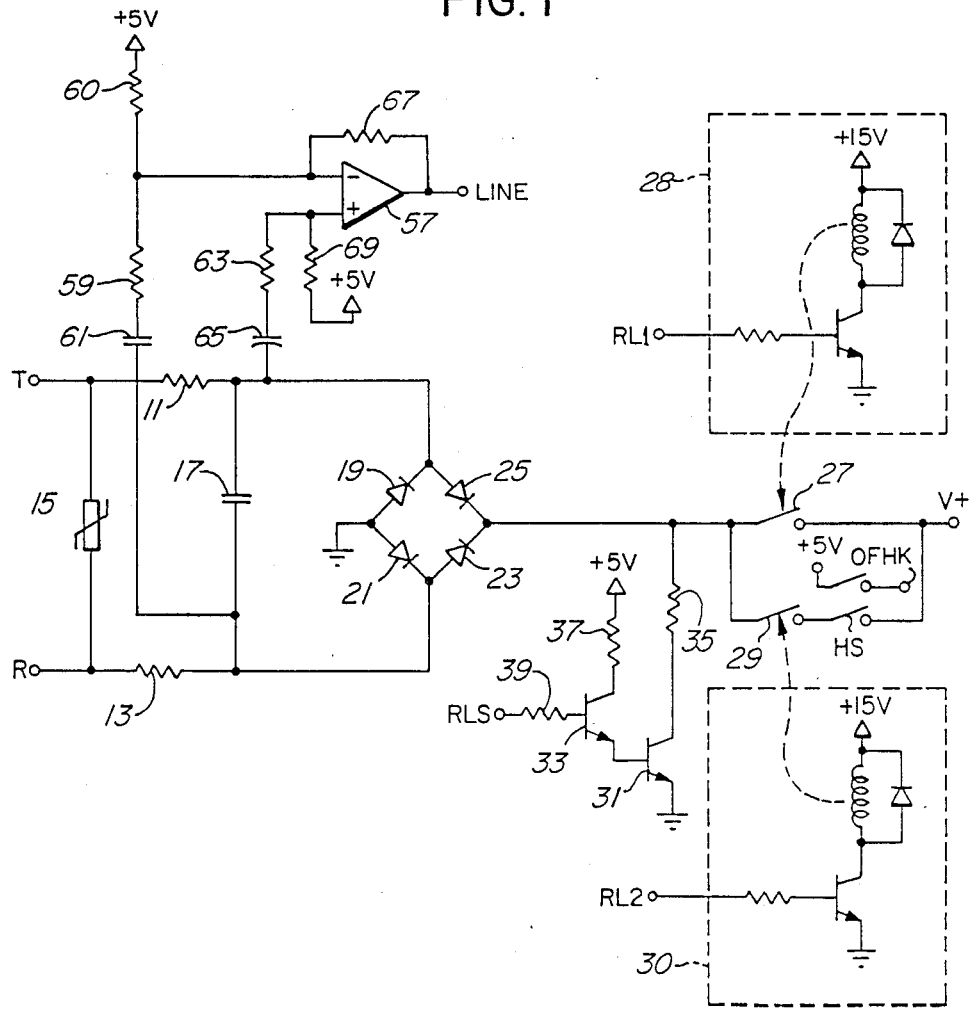
Figure 3:
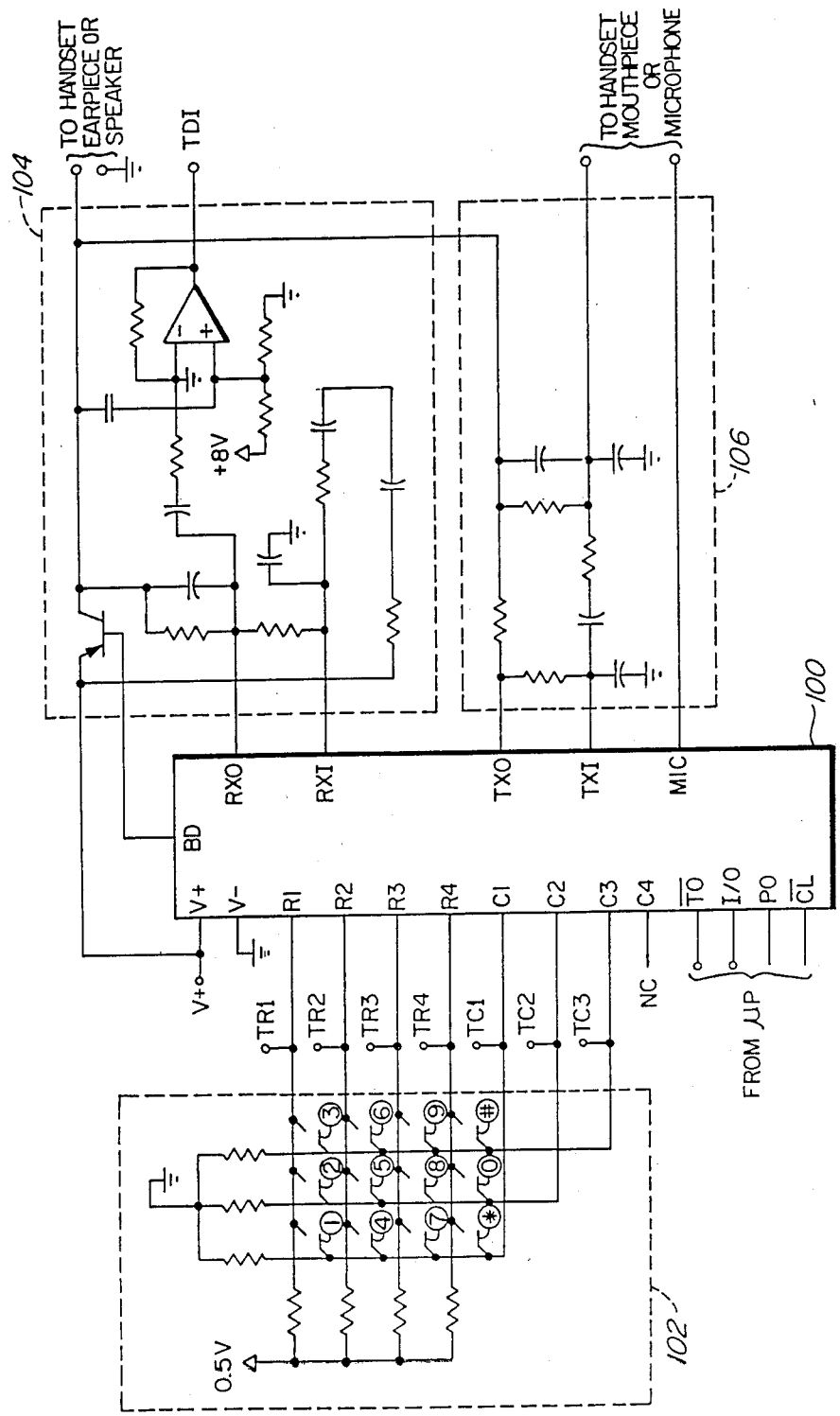
Figure 4:
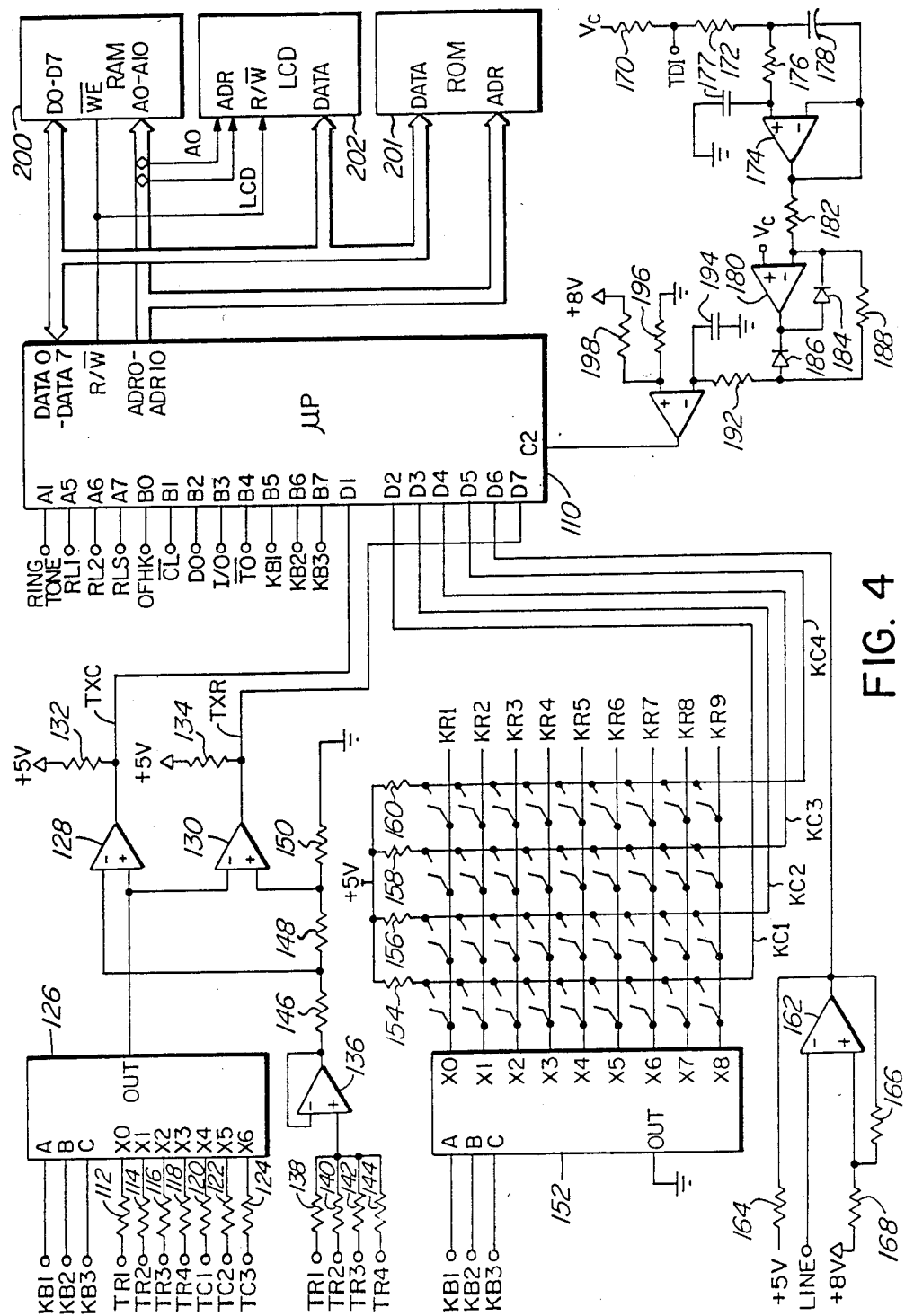

A better understanding of the invention will be obtained with reference to the detailed description below in conjunction with the following drawings, in which:

FIG. 1 is a plan view of a portion of a subscriber set according to the present invention, illustrating a plurality of soft keys and an LCD display, FIG. 2 is a schematic diagram of line interface circuitry of the subscriber set according to a preferred embodiment of the present invention, FIG. 3 is a schematic diagram of electronic telephone circuitry of the subscriber set according to the preferred embodiment, and FIG. 4 is a schematic diagram of microprocessor circuitry according to the preferred embodiment.

With reference to FIG. 1, an LCD display 1 is illustrated for generating a plurality of special feature prompt messages arranged in five columns associated with five progrmmmable or soft keys 2-6, respectively.

During the course of a telephone call, LCD 1 provides an indication of which of a plurality of special features may be implemented by the PABX or centrex facility at a particular instant of time, depending on which special features have been programmed into the set, as described in greater detail below.

For example, in the event the set is on-hook, the prompt messages would typically be: "PROGRAM", "PICK-UP", "PAGE", "SPEED CALL" and "FEATURE". Once a subscriber goes off-hook, the display would typically indicate the following special feature prompt messages; "PROGRAM", "TRANS", "CALLBACK", "AUTO REDIAL" and "HANG UP". The desired special feature is selected by pressing the soft key located directly below the corresponding prompt message. In response, the set generates the predetermined special feature access code signal (typically in the form of a hookswitch flash followed by one or more dialled digits) for application to the tip and ring leads connected to the PABX or centrex facility. New prompt signals may then appear to guide the subscriber through subsequent steps required to implement the selected special feature.

Accordingly, a plurality of special features are associated with each one of the soft keys, but are available for implementation at different times during the course of a telephone call, as indicated by the particular prompt message signals being displayed at a particular instant in time.

Additional prompt signals may appear in the region of LCD 1 denoted as 1A, disposed above the five columns of special feature prompt signals, and comprised, for instance a 15 character dot matrix LCD read out. For instance, in the event the set is not in use, the date and time are displayed in region 1A; in the event of an incoming call a "RINGING" message is displayed; and in the event one or more reminders have been programmed into the set, messages such as CALL JOHN 11 A.M. are displayed at a predetermined time on a predetermined day.

In order to program the set to implement a special feature (for example, HOLD) while the set is on-hook with no call in progress, the user depresses soft key 2 in order to implement the "PROGRAM" function. Subsequently, the prompt signal associated with key 2 changes to "PBX". The user redepresses key 2 to confirm that a PBX feature is to be programmed. Thereupon, a list of possible PBX or centrex special features appears at region 1A in a predetermined sequence. The first feature is "TRANSFER", and the prompt signal associated with key 2 changes to "YES" while the prompt signal associated with key 3 changes to "NO". The user then depresses one of either keys 2 or 3 to indicate whether or not the "TRANSFER" feature is to be programmed. In response to depressing key 3 corresponding to "NO", the next special feature prompt signal "CANCEL" appears in the blank region 1A of LCD 1. By successively depressing the NO key 3 three more times, the "CANCEL", "CONFERENCE" and "SET HOLD" feature prompts are successively displayed. Upon depressing key 3 a fourth time, the "SYSTEM HOLD" prompt signal appears at 1A, corresponding to the special feature that is desired to be programmed into the set.

As discussed above, different PABXs and centrex facilities typically require different special feature access codes to implement a given special feature. For instance, a Mitel Corporation Entrepreneur ® PABX requires a hookswitch flash, detection of PABX dial tone, followed by the digit 5 dialled twice in order to implement the "SYSTEM HOLD" special feature. Accordingly, in order to program the set to implement the "SYSTEM HOLD" feature with an Entrepreneur ® PABX, the user depresses a hookswitch flash key on the set (not shown), followed by depression of a dial tone detect key (also not shown), then dials the digit 5 twice, and finally depresses soft key 5 to implement the "SAVE" function.

Accordingly, the set will now have been programmed to generate the proprietary access code signal for implementing a "SYSTEM HOLD" special feature on an Entrepreneur ® PABX, in response to depressing key 4 when the "HOLD" prompt is displayed during the course of a telephone call.

The PABX and centrex features which appear in successive order at region 1A on LCD 1 for the purposes of programming, are as follows: TRANSFER, CANCEL, CONFERENCE, SET HOLD, SYSTEM HOLD, LOCAL ON HOLD, REMOTE ON HOLD, GROUP PICK-UP, DIRECT PICK-UP, PAGING, SWAP, CALL BACK, CALL FORWARD, DO NOT DISTURB ON, DO NOT DISTURB OFF, TRUNK code A, TRUNK code B, TRUNK code C, TRUNK code D, BUSY, DIAL, COMP, PAUSE, RETRY WAIT, FLASH TIME, and RETRIES.

With reference to FIG. 2, line interface circuitry is illustrated for connecting tip and ring leads (T and R) of a balanced telephone line to an electronic telephone circuit discussed in greater detail below with reference to FIG. 3.

Input resistors 11 and 13 are connected to the tip and ring terminals (T and R) respectively, for limiting excess current flow and thereby protecting input circuitry of the electronic telephone chip.

A varistor 15 is connected to the tip and ring terminals (T and R) for clamping the differential voltage between tip and ring leads to a predetermined level and conducting current during high current surges. A capacitor 17 is connected to resistors 11 and 13 for providing a short circuit path to radio frequency signals appearing on the tip and ring leads.

A tip and ring diode bridge is shown comprised of diodes 19, 21, 23 and 25, wherein the anode of diodes 19 and 21 are connected to a circuit common while the cathodes of diode 19 and 21 are connected to the anodes of diodes 23 and 25 respectively, the cathodes of diodes 23 and 25 being connected together and to relay contacts 27 and 29.

All circuitry within the subscriber set is referenced to the voltage appearing on the tip and ring leads via the tip and ring diode bridge. Consequently, isolation of microprocessor logic circuits (discussed below with reference to FIG. 4) and the electronic telephone circuit (FIG. 3) are not required. Elimination of such expensive isolation circuitry contributes to the low cost construction of the subscriber set according to the present invention.

The tip and ring diode bridge ensures proper operation of the electronic telephone circuit (FIG. 3) independent of tip and ring voltage polarity. Audio signals appearing on the tip and ring terminals (T and R) thus appear in unbalanced form between circuit common potential (i.e. the node connecting diodes 19 and 21) and the node connecting diodes 23 and 25.

Relay contact 27 is normally open, but is closed during hands free operation of the subscriber set, while contact 29 is normally closed except for generating a hookswitch flash, as discussed below. Hookswitch HS is normally held in an open position by a telephone handset (i.e. when the handset is on-hook), but closes in response to a local subscriber lifting the handset, (i.e. handset goes off-hook), thereby completing an audio signal path between the remote PABX or centrex and the electronic telephone circuit (FIG. 3).

The hookswitch HS includes a further contact connected to a source of +5 volts on one side, and to an OFHK terminal connected to the microprocessor (FIG. 4) for providing an indication to the microprocessor of whether or not the set is off-hook.

During dial pulsing, both relay contacts 27 and 29 remain open in order to protect the electronic telephone circuit from logic latch-up due to voltage spikes. Relay drive circuits 28 and 30 are provided for actuating contacts 27 and 29 respectively, in response to receiving control signals from the microprocessor, as discussed in greater detail below with reference to FIG. 4.

Dial pulse and line termination circuitry is provided by transistor 31 in conjunction with transistor 33 and resistors 35, 37 and 39. Dial pulsing is effected by alternately turning transistor 31 on and off, thereby effectively switching resistor 35 across the tip and ring leads (T and R) via the aforementioned tip and ring bridge.

In addition to providing dial pulsing, resistor 35 provides a termination impedance for preventing high voltage arcing across contacts 27 and 29 during opening and closing of the contacts, as described in greater detail below.

Ringing voltage detection circuitry is provided by a differential amplifier 57 having inverting and non-inverting inputs thereof connected to input resistors 13 and 11 via series resistor capacitor pairs 59, 61 and 63, 65, respectively. In a successful prototype, the series resistor capacitor pairs 59, 61 and 63, 65 were combined to each to form a filter having a corner frequency of approximately 12.2 hertz.

A feedback resistor 67 is connected to the inverting input and an output of differential amplifier 57, and a voltage divider resistor 69 is connected to a source of +5 volts and the non-inverting input. According to the successful prototype, the overall gain of amplifier 57 from the tip and ring leads (T and R) to the LINE output, was approximately, 0.07. The LINE output is connected to additional circuitry of the microprocessor (FIG. 4), for detecting the presence of 20 hertz 90 volt RMS ringing signals, as described in greater detail below.

An electronic telephone circuit 100 is illustrated in FIG. 3, having a V+ input connected to the V+ terminal of the line interface circuitry shown in FIG. 2, and a V− input connected to the circuit common.

A DTMF keypad is illustrated schematically by the circuit denoted as 102 for generating control signals or terminals TR1–TR4 and TC1–TC3 for application to the R1–R4 and C1–C3 control inputs of telephone circuit 100, for detecting depression of DTMF keys 0–1, * and #. The DTMF keypad circuitry 102 is in preferably in the form of a standard switch matrix keypad.

Control terminals $\overline{TO}$, I/O, DO and $\overline{CL}$ are connected to corresponding terminals of the microprocessor circuit discussed in greater detail below with reference to FIG. 4, for effecting handshaking communication between the telephone circuit and microprocessor.

Receive terminals RXO and RXI are connected via receive circuitry 104 to the V+ terminal, BP terminal, and one of either a handset earpiece or handsfree speaker and a tone detection terminal TDI. Receiver circuitry 104 is comprised preferably of circuitry for transmitting signals carried by the RXO terminal for application to the handset earpiece or speaker. According to the successful prototype, a buffer amplifier is used to amplify received signals from the RXO terminal by a nominal gain of 20 dB and transmit the signals to the speaker or tone detection terminal TDI.

TXO and TXI terminals are connected via transmit circuitry 106 to the V+ terminal and one of either a handset mouth piece or microphone. Circuit 106 receives signals from either of the handset mouth piece or handsfree microphone in a well known manner With reference to FIG. 4, the microprocessor 110 is illustrated having an output port terminal A1 for generating a +5 volt squarewave signal at a predetermined selectable frequency and warble rate, and denoted as "RING TONE". The "RING TONE" signal is filtered and amplified via a speaker amplifier (not shown) associated with the subscriber set, for generating a ringing signal via the speaker, to alert the local subscriber that a call is being received.

As discussed above with reference to FIG. 2, microprocessor 110 generates control signals RL1 and RL2 on the A5 and A6 output terminals thereof for application to relay drive circuits 28 and 30, respectively (FIG. 2). Similarly, the A7 terminal of microprocessor 110 carries an RLS control signal for application to the dial pulse and line termination circuitry discussed above with reference to FIG. 2.

Input port terminal BO is connected to the hookswitch HS for detecting whether the set is off-hook or on-hook as described in greater detail below.

Bidirectional port terminals B1–B4 carry the aforementioned $\overline{CL}$, DO, I/O, $\overline{TO}$ control signals for bidirectional handshaking communication between the microprocessor 110 and electronic telephone circuit 100 (FIG. 3).

The TR1–TR4 and TC1–TC3 terminals from DTMF keypad 102 (FIG. 3) are applied via respective resistors 112–124 to the X0–X6 inputs respectively of an analog demultiplexer 126. Control inputs A, B and C of demultiplexer 126 receive control signals via terminals KB1–KB3 from the B5–B7 output port terminals of microprocessor 110. An output terminal OUT of demultiplexer 126 is connected to a non-inverting input of a COLUMN comparator 128 and the inverting input of a ROW comparator 130, comparators 128 and 130 functioning collectively as a window comparator. The outputs of comparators 128 and 130 are each connected to a source of +5 volts via pull-up resistors 132 and 134 respectively.

The signals carried by the TR1–TR4 terminals are applied to a non-inverting input of a voltage follower 136 via respective resistors 138–144. The output of voltage follower 136 is connected to the inverting input thereof and to series connected voltage divider resistors 146, 148 and 150.

The node connecting resistors 146 and 148 is connected to the inverting input of COLUMN comparator 130, the node connecting resistors 148 and 150 is connected to the non-inverting input of ROW comparator 128, and the remaining terminal of resistor 150 is connected to the circuit common. Resistors 146, 148 and 150 comprise a voltage divider for establishing threshold voltages for operation of the window comparator comprising comparators 128 and 130.

COLUMN and ROW comparators 128 and 130 generate column and row detection signals TXC and TXR respectively for connection to D1 and D7 input port terminals of microprocessor 110.

Additional key detection circuitry is provided via demultiplexer 152 having inputs X0-X7 connected to a plurality of conductors KR1-KR8. A further plurality of conductors KC1-KC4 are connected to the D2-D6 input port terminals of microprocessor 110 and via resistors 154-160 to the source of +5 volts, and a plurality of non-DTMF keys are connected between respective ones of the conductors KR1-KR8 and KC1-KC4. According to the successful prototype, the non-DTMF keys include the aforementioned soft keys 2-6 as well as a plurality of speed call keys, some of which are dual function keys. One of the dual function speed call keys operates as the aforementioned hookswitch flash key and another one operates as the detect dial tone key.

Control inputs A, B and C of demultiplexer 152 are connected to the aforementioned B5-B7 terminals of microprocessor 110 via the aforementioned KB1-KB3 control terminals respectively, and the output terminal OUT is connected to the circuit common.

In the event a predetermined one of the DTMF key switches (FIG. 3) is depressed, the signal levels on the corresponding row and column conductors change from their normal voltages of 0.5 volts and 0 volts, respectively, to approximately 0.25 volts each. Microprocessor 110 polls respective inputs X0-X6 of demultiplexer 126 by generating predetermined control signals on terminals KB1-KB3 and monitoring the signals applied to the D1 and D7 input port terminals.

In the event no DTMF key is depressed, the output TXR of ROW comparator 130 will be at a higher level than the threshold voltage applied to the non-inverting input thereof such that the TXR signal goes to a low voltage level. Also, the voltage level appearing on the TC1-TC3 conductors will be less than the threshold voltage level applied to the inverting input of COLUMN comparator 128, such that the TXC signal remains at a low voltage level.

In the event a key is depressed, three of the four signals TR1-TR4 are at a nominal 0.5 volt level while the fourth signal is at a nominal 0.25 volt level. Therefore, the voltage at the non-inverting input of voltage follower 136 is voltage divided via equal valued resistors 138-144 to a level of approximately 0.437 volts. Consequently, the threshold voltage level applied to the inverting input of COLUMN comparator 128 goes to approximately 0.337 volts while the threshold voltage applied to the non-inverting input of ROW comparator 130 goes to approximately 0.099 volts in response to voltage division via resistors 146-150.

Microprocessor 110 connects successive ones of the conductors KR1-KR8 connected to terminals X0-X8 of demultiplexer 152, to circuit common via the output OUT, by generating predetermined control signals KB1-KB3 for application to the A, B and C control inputs. Next, microprocessor 110 polls the D2-D6 terminals to detect the value of KC1-KC4 signals. In the event one of the KC1-KC4 signals is at a logic low level, then microprocessor 110 detects that the corresponding key connecting the polled one of the COLUMN conductors and selected one of the ROW conductors has been depressed.

As discussed above with reference to FIG. 2, the LINE signal is transmitted from ringing signal detection amplifier 57 (FIG. 1) for application to an inverting input of a hysteresis comparator 162, (FIG. 4). An output of comparator 162 is connected to a source of +5 volts via pull-up resistor 164, to a non-inverting input thereof via feedback resistor 166, and also to the D6 terminal of micropocessor 110. The non-inverting input is also connected to a source of +8 volts via pull-up resistor 168.

As discussed above with reference to FIG. 3, the TDI signal output from receive circuitry 104 is applied to the node connecting resistors 170 and 172 and applied therefrom to capacitor 177 and to the non-inverting input of a differential amplifier 174 through input resistor 176 and to an inverting input thereof via a capacitor 178. An output of amplifier 174 is connected to the inverting input thereof and to the inverting input of a further differential amplifier 180 via input resistor 182. The non-inverting input of amplifier 180 is connected to a $V_c$ voltage source and an output thereof is connected to the inverting input via a diode 184. The output of amplifier 180 is connected via a further diode 186 through a resistor 188 to the inverting input thereof.

The node connecting the anode of diode 186 and feedback resistor 188 is connected to an inverting input of an additional comparator 190 via input resistor 192. The inverting input of amplifier 190 is connected to circuit common via capacitor 194 and the non-inverting input thereof is connected to circuit common via resistor 196 and to the +8 volt source via resistor 198. The output of amplifier 190 is connected to a further input port terminal C2 of microprocessor 110.

A random access memory (RAM) 200 has data terminals D0-D7 connected to corresponding terminals DATA 0-DATA 7 of microprocessor 110 via a data bus, and ADDRESS inputs A0-A10 connected to corresponding ADDRESS outputs ADR0-ADR10 of microprocessor 110, via an address bus thereof. A read/write output $R\overline{W}$ of microprocessor 110 is connected to a write enable input $\overline{WE}$ of RAM 200.

According to the successful prototype, RAM 200 was a 2k×8-bit memory circuit. RAM 200 is selected by reading or writing to a predetermined address designated by the signals on the ADR0-ADR10 terminals of microprocessor 110. The $R\overline{W}$ signal from microprocessor 110 controls whether the RAM 200 is operated in a read or write mode. The aforementioned special feature access codes discussed above with reference to FIG. 1 are stored in RAM 200, as well as speed call numbers.

A read only memory 201 is also connected to the data and address buses of microprocessor 110 in a well known manner. ROM 201 can be, for example an EPROM, for storing an operating system program of the subscriber set.

An LCD driver circuit 202 has data inputs thereof connected to the DATA 0-DATA 7 terminals of microprocessor 110 via the data bus and a read/write terminal $R/\overline{W}$ connected to the $R/\overline{W}$ terminal of microprocessor 110. The A0 address bit from microprocessor 110 is utilized in conjunction with a decoded address bit designated as LCD to select and control the LCD display 1 (FIG. 1) in a well known manner.

In order to better understand the invention, a scenario will be considered with reference to FIGS. 2, 3 and 4, wherein an incoming call causes ringing at a local subscriber set according to the present invention such that the prompt signal "RINGING" appears on LCD display 1 (FIG. 1). In response, the local subscriber answers the call and activates the "SYSTEM HOLD" special feature discussed above with reference to FIG. 1, in response to depressing the "HOLD" soft key 2 (FIG. 1).

With reference to FIG. 2, in the event of an incoming call, a 20 hertz, 90 volt RMS ringing signal appears on the tip and ring terminals (T and R), and is applied to the inverting and non-inverting inputs of amplifier 57 via A.C. coupling capacitors 61 and 65 and input resistors 59 and 63. Voltage division is provided by low valued resistors 60 and 69, and high valued input resistors 59 and 63, resulting in an overall attenuation from the tip and ring leads to the output of amplifier 57 in the order of 0.7 (neglecting the impedance of capacitors 61 and 65).

In response, the LINE signal alternates from approximately 0 to 8 volts at the ringing frequency of 20 hertz, causing amplifier 62 to generate a 20 hertz signal alternating from 0 to 5 volts for detection by microprocessor 110 via the D6 terminal thereof.

Microprocessor 110 performs a sampling subroutine for detecting the ringing signal applied to the D6 terminal. According to a successful prototype, ringing signals were detected having nominal voltage of greater than at least 40 volts RMS and frequency between 15 hertz and 68 hertz.

In response to detection of the ringing signal, microprocessor 110 generates the aforementioned warbling ringing tone via the A1 output port thereof. As described above, the 5 volt squarewave appearing in the RING TONE terminal is buffered and filtered for application to the handsfree speaker of the set (not shown).

Also, microprocessor 110 addresses LCD driver 202 for generating the "RINGING" prompt on LCD display 1.

In the event the local subscriber picks up the handset, thereby going off-hook, hookswitch HS closes, thereby applying a +5 volt OFHK control signal to the B0 input terminal of microprocessor 110.

In response, microprocessor 110 causes relay contact 29 to close. However, prior to doing so, the termination impedance 35 is first connected to the telephone line in order to prevent arcing across the relay contact.

In particular, microprocessor 110 generates the aforementioned RLS control from the A7 port terminal, for application to the base terminal of transistor 33 (FIG. 2) via input resistor 39. In response, the base-emitter circuit of transistor 33 becomes forward biased such that the +5 volt source is connected through resistor 37 and transistor 33 to the base input of transistor 31 which in turn becomes forward biased, thereby connecting the termination resistor 35 (typically 100 ohms) to the telephone line. Next, microprocessor 110 generates the aforementioned RL2 control signal via the A6 terminal thereof for causing relay driver 30 to close contact 29 in a well known manner, thus completing an audio path from the tip and ring terminals (T and R) to the V+ terminal of electronic telephone circuit 100.

Audio signals are transmitted to and received from the telephone handset or handsfree microphone and speaker via the RX0 and TX1 terminals of circuit 100 in conjunction with the received and transmit circuits 104 and 106 respectively, in a well known manner.

In response to detection of the OFHK control signal, microprocessor 110 generates the signal prompts "HOLD", "TRANS/CONF", "FLASH DIAL", "CONTINUE" and "HANG-UP" on LCD 1, corresponding to specific stored special feature access codes associated with respective ones of the soft keys 2-6 (FIG. 1).

In response to depressing soft key 2, microprocessor 110 detects the corresponding switch closure via demultiplexer 152 and accesses a predetermined address of RAM 200 corresponding to the accessed key. The addressed location contains the aforementioned special feature access code (e.g. hookswitch flash followed by dial tone detection and dialling of the digits "55").

Next, microprocessor 110 performs a hookswitch flash by connecting termination resistor 35 to the line, opening relay contact 29, disconnecting the termination resistor 35, and approximately 500 milliseconds later reconnecting termination resistor 35, reclosing contact 29 and redisconnecting termination resistor 35.

The microprocessor 110 then performs the aforementioned dial tone detection subroutine. In particular, dial tone carried by the telephone line is received from the V+ terminal and receiver circuitry 104 and applied to the RX1 terminal of telephone circuit 100. The dial tone signal is transmitted internally through electronic telephone circuit 100 and appears on the RX0 terminal thereof. The dial tone signal passes through receive circuitry 104 to appear on the TDI terminal.

Signals applied to the TDI terminal are passed through a low pass filter comprised of amplifier 174, capacitors 177 and 178 and resistors 172 and 176. Resistor 170 connected to the $V_c$ voltage source, provides D.C. bias for amplifier 174. Amplifier 180 in conjunction with diode 186, functions as a half-wave rectifier for receiving the filtered signal output from amplifier 174 and generating an output signal in the form of a negative half-wave rectified signal applied to capacitor 194 and the inverting input of amplifier 190.

In response, capacitor 194 is gradually discharged through diode 186, in incremental steps in response to successive generation of the negative half-wave rectified signals. Capacitor 194 is thus discharged to in equilibrium voltage level at which the extent of discharging via diode 186, per cycle, is approximately equal to the amount of charging from the $V_c$ voltage maintained at the inverting input of amplifier 180, the voltage on capacitor 194 goes below the threshold voltage applied to the non-inverting input of amplifier 190, the output of amplifier 190 goes to a high voltage level, signalling microprocessor 110 via terminal C2, that dial tone is present.

In response to detection of dial tone, microprocessor 110 causes electronic telephone circuit 100 to generate DMF on the V+ terminal corresponding to the digits "55", in response to generation of predetermined control signals on the $\overline{TO}$, I/O, DO and $\overline{CL}$ terminals. Alternatively, microprocessor 110 may cause generation of rotary dialled signals by alternately connecting and disconnecting termination resistor 35 to the tip and ring terminals (T and R). The DTMF tone generation circuitry is of standard design and is typically integral with the electronic telephone circuit 100.

Upon receiving the generated special feature access code signal, the PABX implements the HOLD feature according to well known techniques, and th user is then free to attend to other matters or to remove the call from HOLD by depressing the "UNHOLD" key 2, and continue with the conversation.

In summary, a local subscriber may store a plurality of special feature access codes in RAM 200 according to the programming technique discussed above with reference to FIG. 1. In response, microprocessor 110 generates signal prompts via LCD 1 to indicate availability of generation of the predetermined special feature access codes programmed by the local subscriber. The availability of generation, and consequently the signal prompts indicative thereof, vary throughout the course of a telephone conversation such that the local subscriber is prompted at each step via LCD 1.

Accordingly, the subscriber set of the present invention incorporates the principle advantage of prior art proprietary sets wherein soft keys are utilized and message displays generated, as well as the principle of prior art speedial sets wherein programmable signalling (e.g., hookswitch flash followed by DTMF tone) is provided for accommodating PABX or centrex systems supplied by different manufacturers or telephone facilities. The set according to the present invention performs preliminary call processing and generates LCD prompt messages to guide a user through the one or more steps for implementing a special feature, with the result that the subscriber set is very user friendly.

A person skilled in the art understanding the present invention may conceive of other embodiments or modifications thereof. For example, display 1 could be an LED or any other type of electronic display. All such modifications and embodiments are believed to be within the sphere and scope of the present invention as defined by the claims appended hereto.

We claim:

1. A subscriber set for connection via tip and ring leads to a communication system for implementing a plurality of special features, comprised of:
   (a) means for bidirectionally translating audio signals between the set and said communications system,
   (b) a plurality of soft keys associated with predetermined ones of said special features, wherein said predetermined special features are independent of the number of said keys, each key being associated with different ones of said plurality of special features at different times during the course of a telephone call with said subscriber set,
   (c) means for programming said set to generate and transmit to said communication system predetermined special feature access code signals in response to depression of a predetermined one or a sequence of said soft keys in order to implement said predetermined special features, and
   (d) visual display means for generating prompt signals associated with said predetermined one or sequence of said soft keys for prompting the depression of said predetermined one or sequence of soft keys in order to generate said special feature access code signals.

2. A subscriber set as defined in claim 1, further including means for storing one or more reminder messages for display at a predetermined time and date on said visual display means.

3. A subscriber set as defined in claim 1, further including means for generating an indication on said visual display means of the length of a call in progress.

4. A subscriber set as defined in claim 1, further including speedcall means for automatically dialling predetermined digits corresponding to a predetermined remote party and generating an indication on said visual display means of the name of said remote party while said digits are being automatically dialled.

5. A subscriber set as defined in claim 1, wherein said special feature access code signal is comprised of a hookswitch flash followed by one or more dialled digit signals.

6. A subscriber set as defined in claim 5, wherein said dialled digit signals are comprised of one of either rotary dialled or DTMF signals.

7. A subscriber set as defined in claim 1, wherein said special feature access code signals are comprised of one of either PABX or centrex feature access code signals.

8. A subscriber set as defined in claim 6, further including:
   (a) a microprocessor connected to said plurality of keys, for detecting depression of predetermined ones of said keys and generating predetermined command signals in response thereto,
   (b) relay circuitry connected in series with said tip and ring leads and to said microprocessor for receiving a predetermined one of said command signals and generating said hookswitch flash in response thereto, and
   (c) an electronic telephone circuit connected to said tip and ring leads and said microprocessor, for receiving a further one of said command signals and generating said dialled digit signals in response thereto.

9. A subscriber set as defined in claim 8, further including random access memory means connected to said microprocessor, for storing said predetermined control signals.

10. A subscriber set as defined in claim 8, wherein said electronic telephone circuit includes means for detecting dial tone carried by said tip and ring leads and communicating said detection to said microprocessor.

11. A subscriber set as defined in claim 8, wherein said electronic telephone circuit includes means for generating said one of the either rotary dialled or DTMF signals.

12. A subscriber set as defined in claim 8, further including a speaker, a microphone, and means within said electronic telephone circuit for translating said audio signals between said tip and ring leads, and said speaker and microphone, thereby implementing a loudspeaking telephone.

13. A subscriber set as defined in claim 8, wherein said electronic telephone circuit includes means for detecting a ringing signal carried by said tip and ring leads and communicating said detection to said microprocessor, whereupon said microprocessor generates a warbling ringing tone, and also generates a predetermined one of said command signals to said visual display means which in response generates a visual signal indicative of detection of ringing signal.

14. A subscriber set as defined in claim 9, wherein said predetermined control signals are comprised of one of either PABX or centrex feature access code signals.

15. A subscriber set as defined in claim 5, wherein said special feature access code signals are comprised of one of either PABX or centrex feature access code signals.

16. A subscriber set as defined in claim 6, wherein said special feature access code signals are comprised of one of either PABX or centrex feature access code signals.

* * * * *